US010972212B2

(12) United States Patent
Ji et al.

(10) Patent No.: US 10,972,212 B2
(45) Date of Patent: Apr. 6, 2021

(54) QUALITY PARAMETER TRANSMISSION METHOD, TERMINAL, AND NETWORK SIDE DEVICE (71) Applicant: Huawei Technologies Co., Ltd., Shenzhen (CN)

(72) Inventors: Li Ji, Shanghai (CN); Jun Chen, Shanghai (CN); Zhiming Li, Reading (GB)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/206,174

(22) Filed: Nov. 30, 2018

(65) Prior Publication Data

US 2019/0097753 A1 Mar. 28, 2019

Related U.S. Application Data (63) Continuation of application No. PCT/CN2017/071937, filed on Jan. 20, 2017.

(30) Foreign Application Priority Data

Jun. 3, 2016 (WO) ................ PCT/CN2016/084835

(51) Int. Cl.
*H04L 1/00* (2006.01)
*H04W 24/08* (2009.01)
(Continued)

(52) U.S. Cl.
CPC ........ *H04L 1/0026* (2013.01); *H04L 41/5009* (2013.01); *H04L 41/5067* (2013.01);
(Continued)

(58) Field of Classification Search
CPC ..... H04L 5/0053; H04L 5/003; H04L 5/0094; H04W 74/0833; H04W 72/0446; H04W 72/04
See application file for complete search history.

(56) References Cited

U.S. PATENT DOCUMENTS

2010/0029266 A1   2/2010  Van Gassel et al.
2011/0269402 A1  11/2011  Yi et al.
(Continued)

FOREIGN PATENT DOCUMENTS

CN   101431747 A   5/2009
CN   101489218 A   7/2009
(Continued)

OTHER PUBLICATIONS

"MDT Measurement Model," 3GPP TSG-RAN WG2 Meeting #68bis, R2-100239, Valencia, Spain, pp. 1-3, (Jan. 18-22, 2010).
(Continued)

*Primary Examiner* — Anez C Ebrahim
(74) *Attorney, Agent, or Firm* — Leydig, Voit & Mayer, Ltd.

(57) ABSTRACT

A quality parameter transmission method includes: sending, by the network side device, a first request message to the terminal, where the first request message is used to request a quality parameter related to user experience of a preset service; and after receiving the first request message from the network side device, sending, by the terminal, the quality parameter to the network side device. The network side device obtains, from the terminal, the quality parameter related to user experience of the preset service, and therefore can evaluate network operation quality by using the quality parameter, to facilitate network optimization, provide better network quality for the terminal, and improve user experience.

16 Claims, 5 Drawing Sheets (51) Int. Cl.
*H04L 12/24* (2006.01)
*H04L 29/06* (2006.01)
*H04W 28/24* (2009.01)

(52) U.S. Cl.
CPC ............. *H04L 65/80* (2013.01); *H04W 24/08* (2013.01); *H04W 28/24* (2013.01)

(56) References Cited

U.S. PATENT DOCUMENTS

| | | |
|---|---|---|
| 2014/0269269 A1 | 9/2014 | Kovvali et al. |
| 2015/0138982 A1* | 5/2015 | Wei .................. H04L 65/80 370/235 |
| 2015/0326898 A1 | 11/2015 | Yang et al. |
| 2015/0334153 A1* | 11/2015 | Koster ............... H04L 65/80 709/219 |
| 2017/0202042 A1 | 7/2017 | Gao et al. |

FOREIGN PATENT DOCUMENTS

| | | |
|---|---|---|
| CN | 101730083 A | 6/2010 |
| CN | 102124717 A | 7/2011 |
| CN | 102404780 A | 4/2012 |
| CN | 103179625 A | 6/2013 |
| CN | 103269459 A | 8/2013 |
| CN | 104427625 A | 3/2015 |
| CN | 105307194 A | 2/2016 |
| EP | 2566222 A1 | 3/2013 |
| EP | 2615863 A1 | 7/2013 |
| EP | 2793505 A1 | 10/2014 |
| WO | 2014114219 A1 | 7/2014 |
| WO | 2016070935 A1 | 5/2016 |

OTHER PUBLICATIONS

"3rd Generation Partnership Project; Technical Specification Group Services and System Aspects; Transparent end-to-end packet-switchedstreaming service (PSS); General description (Release 13)," 3GPP TS 26.233 V13.0.0, 18, 3rd Generation Partnership Project—Valbonne, France (Dec. 2015).

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13)," 3GPP TS 26.247 V13.2.0, pp. 1-93, 3rd Generation Partnership Project—Valbonne, France (Dec. 2015).

"3rd Generation Partnership Project; Technical Specification Group Radio Access Network;Evolved Universal Terrestrial Radio Access (E-UTRA); User Equipment (UE) radio access capabilities (Release 13)," 3GPP TS 36.306 V13.1.0, pp. 1-53, 3rd Generation Partnership Project—Valbonne, France (Mar. 2016).

"3rd Generation Partnership Project; Technical Specification Group Radio Access Network;Evolved Universal Terrestrial Radio Access (E-UTRA); Radio Resource Control (RRC); Protocol specification(Release 13)," 3GPP TS 36.331 V13.1.0, pp. 1-551, 3rd Generation Partnership Project—Valbonne, France (Mar. 2016).

"3rd Generation Partnership Project; Technical Specification Group Radio Access Network; Radio Resource Control (RRC); Protocol specification (Release 13)," 3GPP TS 25.331 V13.2.0, pp. 1-2268, 3rd Generation Partnership Project—Valbonne, France (Mar. 2016).

"Information technology—Dynamic adaptive streaming over HTTP (DASH)—Part 1: Media presentation desciption and segment formats; Amendment 2: Spatial relationship description,generalized URL parameters and other extensions," ISO/IEC 23009-1, pp. 1-8, Second edition May 15, 2014, Amendment 2,Jul. 1, 2015, International Standard (2015).

Fielding et al.,"Hypertext Transfer Protocol—HTTP/1.1," Request for Comments: 2616, pp. 1-114, Network Working Group (Jun. 1999).

* cited by examiner

QUALITY PARAMETER TRANSMISSION METHOD, TERMINAL, AND NETWORK SIDE DEVICE

CROSS-REFERENCE TO RELATED APPLICATIONS

This application is a continuation of International Application No. PCT/CN2017/071937, filed on Jan. 20, 2017, which claims priority to International Application No. PCT/CN2016/084835, filed on Jun. 3, 2016, all of which are hereby incorporated by reference in their entireties.

TECHNICAL FIELD

The present invention relates to the field of communications technologies, and in particular, to a quality parameter transmission method, a terminal, a network side device, and a system.

BACKGROUND

During current network communication, a key performance indicator (KPI) based on network communication quality is usually used to evaluate network operation quality. With development of a network and diversification of services, user experience is increasingly important to evaluation of the network operation quality. However, the foregoing KPI-based evaluation manner is to evaluate the network operation quality from a perspective of the network, and impact of user experience on evaluation of the network operation quality cannot be reflected.

SUMMARY

Embodiments of the present invention provide a quality parameter transmission method, a terminal, a network side device, and a system, to evaluate network operation quality from a perspective of user experience.

According to an aspect, an embodiment of the present invention provides a quality parameter transmission method, and the method includes: sending, by a network side device, a first request message to a terminal, where the first request message is used to request a quality parameter related to user experience of a preset service; and after receiving the first request message from the network side device, sending, by the terminal, the quality parameter to the network side device.

In the solution provided in this embodiment of the present invention, the network side device obtains, from the terminal, the quality parameter related to user experience of the preset service, and therefore can evaluate network operation quality by using the quality parameter, to facilitate network optimization, provide better network quality for the terminal, and improve user experience.

In a possible design, before the terminal receives the first request message from the network side device, the terminal may further send an indication message to the network side device.

In an example, the indication message carries first indication information, and the first indication information is used to indicate that the terminal has a quality parameter reporting capability, so that the network side device can send the first request message to the terminal according to the indication.

In another example, the indication message carries third indication information, and the third indication information is used to indicate that the terminal does not have a quality parameter reporting capability, so that the network side device does not send the first request message to the terminal any more or after the network side device sends the first request message, the terminal does not report the requested quality parameter any more.

In still another example, the indication message further carries a service supported by the terminal, or the indication message further carries a service supported by the terminal and a quality parameter corresponding to the service supported by the terminal. For example, in this manner, the terminal may indicate, to the network side device, that the service type supported by the terminal is a streaming service. For another example, in this manner, the terminal may indicate, to the network side device, that the service type supported by the terminal is a streaming service, and all quality parameters corresponding to the streaming service.

In a possible design, before the network side device receives the indication message sent by the terminal, the network side device may further send a second request message to the terminal, and the second request message is used to request information related to the quality parameter reporting capability of the terminal.

In a possible design, the terminal sends the quality parameter to the network side device in at least one of the following reporting manners:

sending, by the terminal, the quality parameter to the network side device periodically, where for example, the terminal reports the quality parameter to the network side device at intervals of 10 s;

sending, by the terminal, the quality parameter to the network side device when the quality parameter meets a preset condition, where for example, when an initial playout delay is greater than 5 s, the terminal reports the quality parameter to the network side device;

sending, by the terminal, the quality parameter to the network side device when the preset service ends, where for example, the terminal sends the quality parameter to the network side device when a video stops playing;

sending, by the terminal, the quality parameter to the network side device in a time period or at a time point that is specified by the network side device, where for example, the terminal sends the quality parameter to the network side device at an o'clock specified by the network side device; or sending, by the terminal, the quality parameter to the network side device when a particular event occurs, where for example, the terminal sends the quality parameter to the network side device when a switch event, a redirection event, or a radio link failure event occurs.

In a possible design, the network side device sends second indication information to the terminal, and the second indication information is used to inform the terminal of the at least one of the reporting manners that may be used to send the quality parameter to the network side device, so that the terminal flexibly selects a manner to report the quality parameter to the network side device.

In an example, the second indication information may be included in the first request message.

In an example, the terminal obtains the quality parameter from the network side device in at least one of the following obtaining manners: obtaining, by the terminal, the quality parameter by using a packet switched service client; and obtaining, by the terminal, the quality parameter by using an entity of an application layer that is corresponding to the preset service.

In an example, the network side device can further send fourth indication information to the terminal, and the fourth indication information is used to inform the terminal of the at least one of the obtaining manners that may be used to obtain the quality parameter, so that the terminal obtains the quality parameter in a more flexible manner.

In a possible implementation, the fourth indication information may be included in the first request message.

In a possible design, a quality parameter obtaining manner of the terminal or the reporting manner in which the terminal sends the quality parameter to the network side device may be determined based on an application scenario, so that the quality parameter is more efficiently transmitted.

In a possible design, the preset service includes one or both of the following: a streaming service and an interactive service.

In an example, when the preset service is a streaming service, a protocol corresponding to the streaming service includes at least one of the following: a video protocol based on Dynamic Adaptive Streaming over Hypertext Transfer Protocol HTTP DASH, a progressive download PD video protocol, and a video protocol based on HTTP Live Streaming HLS; and a quality parameter corresponding to the streaming service includes at least one of the following: a list of HTTP requests or responses, a list of switch events, an average throughput, an initial playout delay, a buffer data volume, a play information list, and media presentation description MPD information.

In another example, when the preset service is an interactive service, a quality parameter corresponding to the interactive service includes at least one of the following: a web response delay, a first page opening delay, a whole page opening delay, and a page integrity indication.

In a possible design, the quality parameter further includes an identifier used to identify a service flow corresponding to the quality parameter, so that the quality parameter more accurately corresponds to the service type and better reflects user experience.

In an example, if the preset service is a streaming service, the quality parameter includes an identifier used to identify a video call flow in the streaming service.

According to another aspect, an embodiment of the present invention provides a terminal, and the terminal has a function of implementing a behavior of the terminal in the foregoing method example. The function may be implemented by using hardware, or may be implemented by hardware executing corresponding software. The hardware or the software includes one or more modules corresponding to the function.

In a possible design, the terminal includes a processor, a receiver, and a transmitter, and the processor is configured to support the terminal in performing a corresponding function in the foregoing method. The receiver and the transmitter are configured to support communication between the terminal and a base station. Further, the terminal may further include a memory, and the memory is configured to couple to the processor, and store program instructions and data of the terminal.

According to still another aspect, an embodiment of the present invention provides a network side device, and the network side device has a function of implementing a behavior of the network side device in the foregoing method example. The function may be implemented by using hardware, or may be implemented by hardware executing corresponding software. The hardware or the software includes one or more modules corresponding to the function.

In a possible design, the network side device may be a base station, or may be another network node, for example, a serving GPRS support node, a mobility management entity, a network entity of a non-access stratum, or a network entity of a radio resource control layer.

In another possible design, the network side device may be a network management unit. For example, the network management unit may be an operations support system (OSS).

In a possible design, when the network side device is a base station, a structure of the base station includes a processor, a transmitter, and a receiver, and the processor is configured to support the base station in performing a corresponding function in the foregoing method. The transmitter and the receiver are configured to support communication between the base station and the terminal. Further, the base station may further include a memory, and the memory is configured to couple to the processor, and store program instructions and data of the base station.

According to still another aspect, an embodiment of the present invention provides a communications system. The system includes the terminal and the network side device described in the foregoing aspects.

According to yet another aspect, an embodiment of the present invention provides a computer storage medium, the computer storage medium is configured to store a computer software instruction used by the foregoing terminal, and the computer software instruction includes a program designed for performing the foregoing aspects.

According to yet another aspect, an embodiment of the present invention provides a computer storage medium, the computer storage medium is configured to store a computer software instruction used by the foregoing network side device, and the computer software instruction includes a program designed for performing the foregoing aspects.

In solutions in embodiments of the present invention compared with the prior art, the network side device obtains, from the terminal, the quality parameter related to user experience of the preset service, and therefore can evaluate network operation quality by using the quality parameter, to facilitate network optimization, provide better network quality for the terminal, and improve user experience.

BRIEF DESCRIPTION OF DRAWINGS

To describe technical solutions in embodiments of the present invention more clearly, the following briefly describes the accompanying drawings. It will be appreciated that the accompanying drawings in the following description show merely some exemplary embodiments of the present invention, and a person of ordinary skill in the art may derive other drawings from these accompanying drawings without creative efforts.

DESCRIPTION OF EMBODIMENTS

To make technical solutions and advantages of embodiments of the present invention clearer, the following describes exemplary technical solutions of exemplary embodiments of the present invention with reference to the accompanying drawings.

Network architectures and service scenarios described herein are not intended to limit the present invention. A person of ordinary skill in the art would appreciate that, with evolution of network architectures and emergence of new service scenarios, technical solutions provided according to embodiments of the present invention may also be applicable to a similar technical problem.

Figure 1:
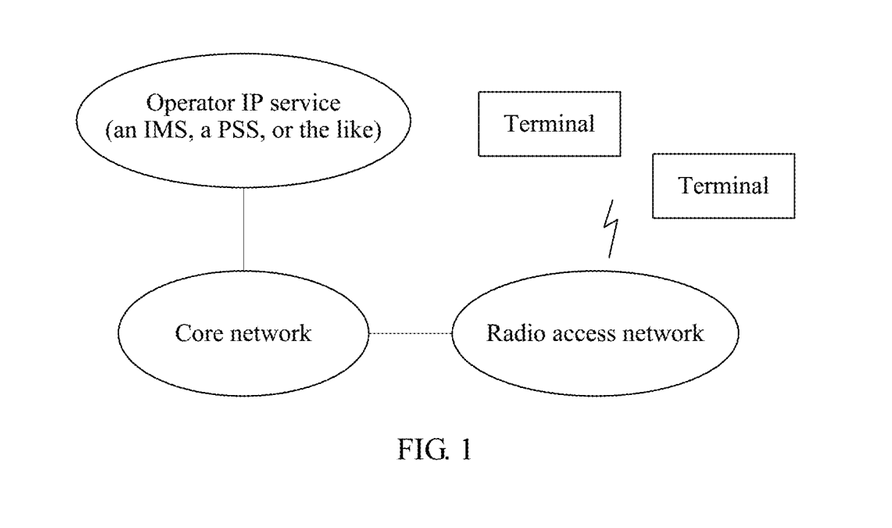
FIG. 1 is a schematic diagram of a possible application scenario according to an embodiment of the present invention.

FIG. 1 is a schematic diagram of a possible application scenario according to an embodiment of the present invention. As shown in FIG. 1, a terminal accesses an operator Internet Protocol (IP) service network by using a radio access network (RAN) and a core network (CN). For example, the operator Internet Protocol service network is an IP multimedia subsystem (IMS) network, a Packet Switched Streaming Service (PSS) network, and the like. The technical solutions described in the present invention may be applied to a Long Term Evolution (LTE) system or other wireless communications systems that use various radio access technologies, for example, systems that use access technologies such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). In addition, the technical solutions may be applied to a subsequent evolved system of the LTE system, for example, a 5th Generation (5G) system. For clarity, the LTE system is only used as an example herein for description. In the LTE system, an evolved universal terrestrial radio access network (E-UTRAN) is used as a radio access network, and an evolved packet core (EPC) is used as a core network. The terminal accesses the IMS network by using the E-UTRAN and the EPC.

The nouns "network" and "system" are usually interchangeably used herein, but meanings of the nouns may be understood by a person skilled in the art. The terminal may include a handheld device, an in-vehicle device, a wearable device, or a computing device that has a radio communication function; another processing device connected to a wireless modem; or user equipment (UE) in various forms, a mobile station (MS), a terminal, and the like. For ease of description, the devices mentioned above are collectively referred to as a terminal. The network side device may include a device in a core network, for example, may include a mobility management network element such as a serving GPRS support node (SGSN) or a mobility management entity (MME), or for another example, may include a network entity with a control plane function in a 5G network or a future network, such as a network entity of a non-access stratum (NAS) or a radio resource control (RRC) layer. The network side device may include a base station (BS). The base station is an apparatus that is deployed in the radio access network and that is configured to provide a wireless communication function for the terminal. The base station may include a macro base station, a micro base station, a relay node, an access point, and the like in various forms. In systems that use different radio access technologies, devices with a base station function may have different names. For example, in the LTE network, the device with a base station function is referred to as an evolved NodeB (eNB or eNodeB); and in a 3rd Generation (3G) network, the device with a base station function is referred to as a NodeB, and the like. In the 3G network, the base station may include a radio network controller (RNC). For ease of description, the foregoing apparatuses that provide the wireless communication function for the terminal are collectively referred to as the base station or the BS.

Figure 2:
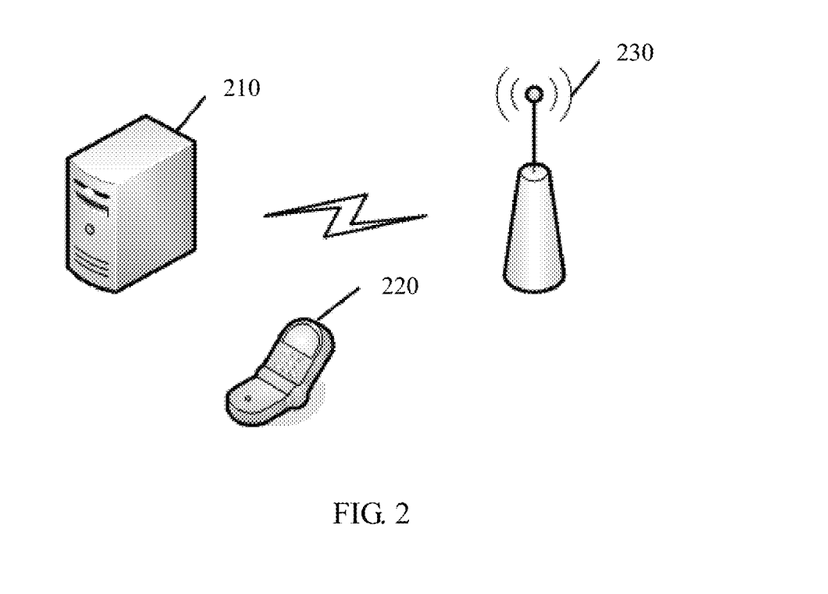
FIG. 2 is a schematic diagram of a possible network architecture according to an embodiment of the present invention.

FIG. 2 shows a possible network architecture according to an embodiment of the present invention. In the network architecture shown in FIG. 2, that a network side device is a base station is used as an example for description. The network architecture includes terminals (such as a terminal 210 and a terminal 220) and a base station 230. The terminals and the base station may communicate with each other by using a cellular network, a wireless local area network (WLAN) or another radio access technology.

In this embodiment of the present invention, the network side device provides a network service for the terminal, and the terminal and the network side device may communicate with each other based on a network connection established between the terminal and the network side device. In this embodiment of the present invention, the network side device may interact with the terminal by using a NAS layer, an RRC layer, a MAC layer, or a physical layer (PHY).

The following further describes exemplary embodiments of the present invention in detail.

An embodiment of the present invention provides a quality parameter transmission method, and a terminal, a network side device, and a system that are based on the method. The method includes: sending, by the network side device, a first request message to the terminal, where the first request message is used to request a quality parameter related to user experience of a preset service; and after receiving the first request message from the network side device, sending, by the terminal, the quality parameter to the network side device. In this way, the network side device obtains, from the terminal, the quality parameter related to user experience of the preset service, and therefore can evaluate network operation quality by using the quality parameter, to facilitate network optimization, provide better network quality for the terminal, and improve user experience.

In this embodiment of the present invention, the terminal may obtain the quality parameter related to user experience of the preset service, and send the quality parameter to the network side device, so that the network side device evaluates the network operation quality, to facilitate network parameter optimization and further adjust the network service provided by the network side device. Further, in a process in which the network side device interacts with the terminal, the terminal may further obtain other parameters (such as KPI information, for example, signal quality, a throughput, and link failure information), and send the parameters to the network side device, so that the network side device can determine a network problem by using the information, to perform network parameter optimization.

Figure 3:
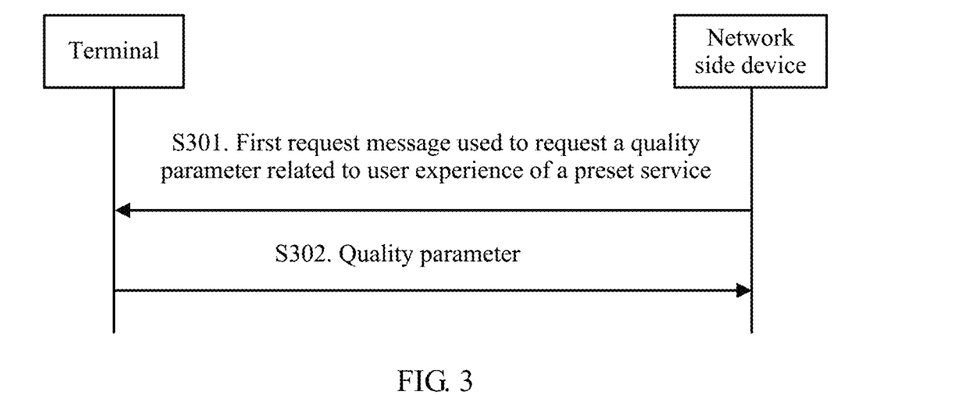
FIG. 3 is a schematic diagram of a quality parameter transmission method according to an embodiment of the present invention.

The following describes the solution provided in this embodiment of the present invention with reference to FIG. 3. FIG. 3 is a schematic diagram of a quality parameter transmission method according to an embodiment of the present invention. As shown in FIG. 3, the method may include the following steps.

In step S301, a network side device sends a first request message to a terminal, where the first request message is used to request a quality parameter related to user experience of a preset service.

Preset services are some services provided by the network side device for the terminal, for example, may be some services that run on the terminal to be used by the terminal, and quality parameters related to user experience of the preset services are some parameters that are evaluated from a perspective of user experience.

In this embodiment of the present invention, the foregoing preset service may include one or both of a streaming service and an interactive service. The streaming service includes a buffer streaming service such as a video, a real-time streaming service such as event on-live and video on demand, a session streaming service such as a video call and a video conference, and the like. The interactive service includes web browsing and database retrieval.

For example, the preset service includes a streaming service, and a protocol corresponding to the streaming service includes at least one of the following: a video protocol based on Dynamic Adaptive Streaming over Hypertext Transfer Protocol (HTTP) (DASH), a progressive download (PD) video protocol, or a video protocol based on HTTP Live Streaming (HLS); and a quality parameter corresponding to the streaming service includes at least one of the following: a list of HTTP requests or responses (List of HTTP Request/Response Transactions), a list of switch events (List of Representation Switch Events), an average throughput (Average Throughput), an initial playout delay (Initial Playout Delay), a buffer data volume (Buffer Level), a play information list (Play List), or media presentation description (MPD) information.

The MPD is a file that describes media play or presentation, and the file may include a video quality parameter, for example, bandwidth, encoding, and resolution.

For another example, the preset service includes an interactive service, and a quality parameter corresponding to the interactive service includes at least one of the following: a web response delay, a first page opening delay, a whole page opening delay, or a page integrity indication.

Still further, the network side device may further request the terminal to send, while sending quality parameters, information about a time point at which these quality parameters are recorded.

Still further, the network side device may further request the terminal to send information about a service flow corresponding to the quality parameter while sending the quality parameter. For example, a terminal side device may simultaneously enable two video streams, or two video streams are in an active state, and the terminal needs to report a video stream for which the quality parameter is recorded by the terminal, for example, a representation ID may be used for identification. For another example, the terminal side device may simultaneously browse a plurality of web pages, and the terminal needs to report a web page corresponding to a quality parameter recorded by the terminal, for example, a representation ID may be used for identification.

Optionally, it should be noted that the preset service in this embodiment of the present invention may further include other types of services, for example, a session service and a background service. A type of the preset service to which the method described in this embodiment of the present invention may be applied is not limited in the present invention. In addition, the quality parameter related to user experience of the preset service may be another quality parameter, and all quality parameters that are related to user experience of the preset service and that are obtained based on a capability of the terminal may be obtained and transmitted in the present invention.

In an example, the first request message may be included in downlink signaling or data sent by the network side device to the terminal. When LTE is used as an example, data may be sent by using the following downlink signaling:

1. RRC signaling sent by the terminal to an LTE eNodeB, for example, RRC connection reconfiguration 2. MAC (Media Access Control,) CE (control element) signaling sent by the terminal to the LTE eNodeB, for example, a buffer status report; and 3. NAS signaling sent by the terminal to an LTE MME, for example, Attach Accept.

In a step S302, the terminal sends the quality parameter to the network side device.

In an example, the terminal may obtain the quality parameter and send the quality parameter to the network side device, in response to the first request message sent by the network side device.

Optionally, in some possible implementations of the present invention, the terminal may obtain the quality parameter from the network side device in at least one of the following obtaining manners:

Manner 1: The terminal obtains the quality parameter by using a packet switched service client.

Manner 2, the terminal obtains the quality parameter by using an entity of an application layer that is corresponding to the preset service.

In another example, the network side device can further send fourth indication information to the terminal, and the fourth indication information is used to inform the terminal of the at least one of the obtaining manners that may be used to obtain the quality parameter.

It should be noted that the fourth indication information may be included in the first request message sent by the network side device to the terminal, or may be independently sent by the network side device to the terminal.

It may be learned that, in the solution of this embodiment, the network side device sends the first request message to the terminal, the first request message is used to request the quality parameter related to user experience of the preset service, and after receiving the first request message from the network side device, the terminal sends the quality parameter to the network side device, so that the network side device obtains, from the terminal, the quality parameter related to user experience of the preset service and can evaluate network operation quality by using the quality parameter, to facilitate network optimization, provide better network quality for the terminal, and improve user experience.

In still another example, before receiving the first request message from the network side device, the terminal can further send, to the network side device, information related to a quality parameter reporting capability of the terminal. For example, the terminal can send an indication message to the network side device, the indication message carries first indication information, and the first indication information is used to indicate that the terminal has the quality parameter reporting capability.

Specifically, the indication message may be included in uplink signaling or data sent by the terminal to the network. When LTE is used as an example, the uplink signaling may be as follows:

1. RRC (Radio Resource Control) signaling sent by the terminal to an LTE eNodeB, for example, UE capability information;
2. MAC CE signaling sent by the terminal to the LTE eNodeB, for example, a buffer status report; and
3. NAS (Non-Access Stratum) signaling sent by the terminal to an LTE MME (Mobility Management Entity), for example, an attach request.

It should be noted that, when sending the quality parameter to the network side device, the terminal reports the quality parameter according to a protocol type of signaling carrying the quality parameter. For example, if the first request message sent by the network side device to the terminal is carried by the RRC signaling, the terminal reports the quality parameter by using the uplink RRC signaling, for example, a measurement report in LTE. If the first request message sent by the network side device to the terminal is carried by the NAS signaling, the terminal reports the quality parameter by using the uplink NAS signaling, for example, an attach request in LTE.

It may be understood that, before the terminal receives a service request message from the network side device, the terminal first sends an indication message to the network side device, and when the indication message carries the first indication information used to indicate that the terminal has a capability of reporting some quality parameters, the network side device can better request, based on the indication message, the quality parameter that the terminal is capable of reporting.

In yet another example, the network side device can indicate, to the terminal, that no quality parameter needs to be collected or reported, and in this case, the terminal may not report the quality parameter according to an indication of the network side device.

In yet another example, the indication message further carries a service supported by the terminal, or the indication message further carries a service supported by the terminal and a quality parameter corresponding to the service supported by the terminal.

Optionally, in a possible implementation, the indication message sent by the terminal to the network side device includes the service supported by the terminal, indicating that the terminal has a capability of reporting a quality parameter related to user experience of the service. Preferably, in this case, the network side device sends the first request message based on the capability of the terminal, in other words, all quality parameters requested in the first request message are quality parameters related to user experience of a service type supported by the terminal. Therefore, the terminal can successfully report the related quality parameter.

Still further, optionally, if a service type related to a quality parameter that the network side device requests to report is not supported by the terminal, the terminal may report only the quality parameter related to user experience of the service supported by the terminal. Optionally, while reporting the quality parameter related to user experience of the service supported by the terminal, the terminal can report a reporting capability indication that the terminal does not support the service type for which the quality parameter is requested by the network side device, to instruct the network side device not to deliver a configuration request for the quality parameter any more.

Still further, for the streaming service, the indication message sent by the terminal to the network side device may include a measurement of at least one of mainstream videos of a protocol type supported by the streaming service, such as DASH/PD, or a measurement of at least one of the following streaming media: on-demand streaming media, live streaming media, or interactive streaming media. The interactive streaming media may be FaceTime, Skype, WeChat, or the like.

Still further, for the streaming service and the interactive service, the indication message sent by the terminal to the network side device may include at least one of a quality parameter corresponding to the streaming service and a quality parameter corresponding to the interactive service.

Still further, in an embodiment of the present invention, a data radio bearer identifier (DRB ID) or a data flow identifier (DF ID) may be added to the indication message sent by the terminal to the network side, so that the network side device configures at least one DRB or DF (including a DRB or a DF of web browsing, video play, or the like). The terminal needs to find a DRB or a DF that supports a corresponding capability, and indicates the DRB or the DF in the indication message to the network side device. The DRB is bearer information that is on an air interface and that is used to distinguish between different services of the terminal, and the DRB ID is corresponding bearer identifier information. The DF (data flow) is flow information that is on the air interface and that is used to distinguish between different services of the terminal, and the DF ID is corresponding flow identifier information. Compared with the DRB, the DF is a further division of the service, and one or more DFs may be mapped to one DRB. On the air interface, the network side device may configure only the DRB or the DF for the terminal, or may configure both the DRB and the DF for the terminal. When both the DRB and the DF are configured for the terminal, the terminal may first map the service to the DF, and then map the service to the DRB.

In all the following descriptions, all DRBs may be replaced with DFs, and all DRB IDs may be replaced with DF IDs.

Optionally, in another possible implementation, the indication message sent by the terminal to the network side device includes both a service supported by the terminal and a quality parameter corresponding to the service supported by the terminal, and may include all or some of quality parameters corresponding to the service. When the network side device sends a request for the quality parameter, the quality parameter may be a quality parameter that is related to the service type supported by the terminal and that is supported by the terminal; or may be a quality parameter that is related to the service type supported by the terminal and that is not supported by the terminal; or may be a quality parameter related to a service type that is not supported by the terminal, so that the terminal reports, based on the capability of the terminal, the quality parameter related to the service type supported by the terminal.

It may be understood that, when the service supported by the terminal is added to the indication message, or the quality parameter corresponding to the service supported by the terminal is further added to the indication message, the network side device may be better instructed to request a quality parameter related to the capability of the terminal when configuring a reporting request for a quality parameter, to improve processing efficiency.

In yet another example, the network side device can further send a second request message to the terminal, and the second request message is used to request information related to the quality parameter reporting capability of the terminal.

Optionally, specifically, when sending the second request message to the terminal, the network side device may send, to the terminal, a service type requested by the network side device.

Specifically, the second request message may be included in downlink signaling/data sent by the terminal to the network. When LTE is used as an example, the downlink signaling may be as follows:

1. RRC signaling sent by an LTE eNodeB to the terminal, for example, a UE capability enquiry;
2. MAC CE signaling sent by the LTE eNodeB to the terminal, for example, activation or deactivation; and
3. NAS signaling sent by an LTE MME to the terminal, for example, Attach Accept.

The information related to the quality parameter reporting capability of the terminal indicates that the network side device may request the terminal to report only an indication that the terminal has the quality parameter reporting capability, or may further simultaneously request other information related to the quality parameter reporting capability of the terminal. For example, the network side device requests the terminal to report a service type that is specifically supported by the terminal and a quality parameter corresponding to the service type. All or some of quality parameters corresponding to the service type may be reported.

Optionally, in an embodiment of the present invention, when an access stratum (AS) of the terminal receives the second request message that is sent by the network side device and that includes the service type, the AS layer of the terminal determines whether the terminal supports the service type.

Optionally, in some possible implementations of the present invention, that the terminal sends the quality parameter to the network side device includes: sending, by the terminal, the quality parameter to the network side device in at least one of the following reporting manners:

Manner 1: The terminal periodically sends the quality parameter to the network side device. For example, when the terminal periodically sends the quality parameter to the network side device, a parameter to be reported by the terminal when the terminal reports the quality parameter is simultaneously set. For example, the terminal may select 10 seconds (10 s) as an interval of reporting experience quality parameter.

Manner 2: The terminal sends the quality parameter to the network side device when the quality parameter meets a preset condition. For example, if the terminal sends the quality parameter to the network side device when the quality parameter meets the preset condition, the preset condition may be that the quality parameter meets a specific threshold condition. For example, when an initial playout delay is greater than 5 s, the terminal reports the quality parameter.

Manner 3: The terminal sends the quality parameter to the network side device when the preset service ends. For example, if the terminal sends the quality parameter to the network side device when the preset service ends, for a streaming service, the terminal may send the quality parameter to the network side device when a video stops playing; and for an interactive service such as web browsing, the terminal may send the quality parameter to the network side device when a web page is closed.

Manner 4: The terminal sends the quality parameter to the network side device in a specified (for example, specified by the network side device) time period or at a specified time point.

Manner 5: The terminal sends the quality parameter to the network side device when a particular event occurs. For example, the particular event may be a switch event, a redirection event, a radio link failure event, or the like. That the terminal sends the quality parameter to the network side device when the switch event occurs may be that the terminal sends, to the network side device, the quality parameter obtained before switching. In this case, the terminal may further send event type information to the network side device, and further, the terminal may further send, to the network side device, identifiers of cells to which the terminal belongs before and/or after switching. The identifier of the cell before or after switching may be a cell global identification (CGI) or a physical cell identifier (PCI).

In a yet another example, the network side device may further send second indication information to the terminal, and the second indication information is used to inform the terminal of the at least one of the reporting manners that may be used to send the quality parameter to the network side device.

It should be noted that the second indication information may be included in the first request message sent by the network side device to the terminal, or may be independently sent by the network side device to the terminal.

It should be noted that the terminal may report the quality parameter in one of the following methods: Method 1: The reporting manner is specified in the second indication information sent by the network side device to the terminal, so that the terminal reports the quality parameter in the reporting manner specified by the network side device. Method 2: The terminal determines one or more reporting manners, so that the terminal reports the quality parameter in the determined one or more reporting manners. If the method 2 is used, the second indication information sent by the network side device may specify only whether reporting is required. For example, an indication of "collecting a service-based quality parameter" may be set to 1 indicating that collecting is required, or 0 indicating that collecting is not required.

It may be understood that, by selecting one of the foregoing reporting manners, the parameter reporting manner of the terminal may vary in different cases, so that the terminal reports the parameter in a more flexible manner.

Figure 4:
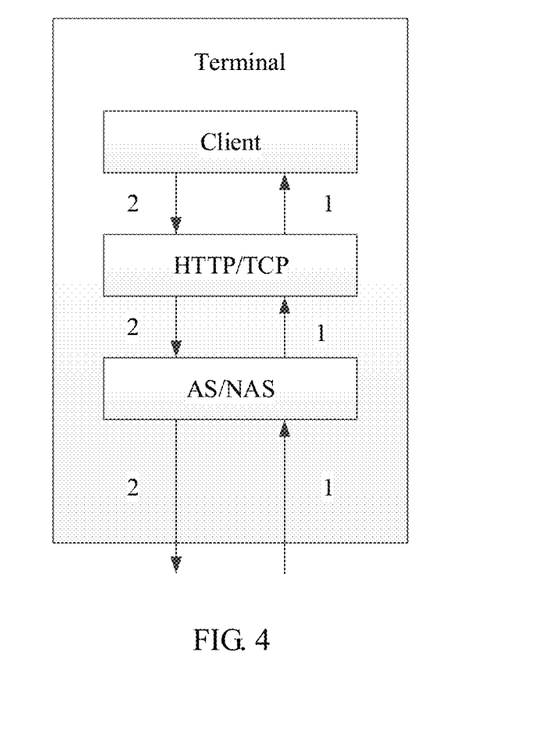
FIG. 4 is a schematic diagram of a possible structure of a terminal according to an embodiment of the present invention.

FIG. 4 is a schematic diagram of a possible structure of a terminal according to an embodiment of the present invention. A client is a module that has a capability of collecting a service-based quality parameter, and may be a PSS client, a DASH client, an HLS client, or the like (which specifically depends on a service type requested by a network side and a service type supported by the terminal). When the terminal receives a message sent by the network side device, an AS/NAS module of the terminal transmits upward the message to the client, to query whether the client has a "capability of collecting/reporting a service-based quality parameter", the client further sends corresponding response information to the AS/NAS module, and then the AS or NAS module sends the corresponding response information to the network side device by using an air interface. When collecting and reporting a service-based quality parameter, the client sends the collected quality parameter to the AS/NAS module, and then the AS or NAS module sends the collected quality parameter to the network side by using the air interface.

Optionally, the network side device may configure, in a first request message, information that "the terminal collects and/or reports service-based experience quality", and send the first request message to the terminal. To be specific, a quality parameter that the network side device needs to request may be configured, or a reporting manner in which the terminal reports the quality parameter at the request of the network side device may be further configured, or an obtaining manner in which the terminal obtains the quality parameter at the request of the network side device may be further configured.

Specifically, a configuration solution of the first request message sent by the network side device may use Extensible Markup Language (XML) or an HTTP POST request, or the first request message may be configured in downlink signaling/data sent by the network side device to the terminal.

Correspondingly, when the terminal reports the quality parameter, a quality parameter reporting message that includes the quality parameter may be generated by using the XML language or the HTTP POST request, or the quality parameter reporting message may be added to uplink signaling/data sent by the terminal to the network side device.

Optionally, if the network side device configures a quality parameter reporting manner in the first request message, in an embodiment of the present invention, when receiving the first request message, the terminal directly transmits the first request message from the AS/NAS to the client. The client generates, based on the request message, a quality parameter reporting message that includes a quality parameter, and then sends the quality parameter reporting message to the AS/NAS in the configured quality parameter reporting manner. For example, the client periodically sends the quality parameter to the AS/NAS, and the AS/NAS then reports the quality parameter to the network side device. It may be understood that, in this manner, more interaction (for example, the reporting manner) between the AS/NAS and the client is required, but processing complexity of the AS/NAS is relatively small.

Optionally, if the network side device configures a quality parameter reporting manner in the first request message, in another embodiment of the present invention, after receiving the first request message, the terminal informs the client of a quality parameter that needs to be obtained, and the AS/NAS and the client agree on, based on the configured quality parameter reporting manner, a manner of transmitting the quality parameter from the client to the AS/NAS. For example, the client periodically sends the quality parameter to the AS/NAS, and then the AS/NAS further generates, based on the first request message, a quality parameter reporting message that includes the quality parameter, and reports the quality parameter reporting message to the network side device. It may be understood that, in this manner, processing complexity of the AS/NAS is relatively great, but interaction between the AS/NAS and the client is relatively small.

Further, specifically, the configuration of the quality parameter and/or the quality parameter reporting manner may provide indications for different service types, for example, may provide indications for a streaming service and an interactive service, respectively.

Still further, specifically, the configuration of the quality parameter and/or the quality parameter reporting manner may further provide indications for different specific services, for example, may provide indications for a video service and a web browsing service, respectively.

Further, when or before the network side device sends a second request message, the network side device may send the configuration of the service type to the terminal. To be specific, when or before the network side device sends a request message to request the terminal to report a "capability of collecting and/or reporting a service-based quality parameter", the network side device configures the service type on which the terminal needs to report, and therefore the terminal may report only capability information related to the service type.

It should be noted that, when the network side device configures information that "the terminal collects and/or reports service-based experience quality", the network side device may combine any of a selected service type, a selected quality parameter, a selected quality parameter obtaining method, and a selected reporting manner to form a configuration solution. For example, when the network side device needs to obtain both a quality parameter of the streaming service and a quality parameter of the interactive service, the network side device can configure a manner in which three quality parameters related to the streaming service are obtained by using a client of a packet switched service and the quality parameters are periodically reported, and also configure a manner in which all quality parameters of the interactive service are obtained by using an application layer entity corresponding to the interactive service and the quality parameters are reported when the interactive service ends. Another combination may be used for parameter configuration.

Still further, it should be noted that, if one of the quality parameter obtaining manner or the quality parameter reporting manner is specified in a protocol, only the other manner needs to be configured.

It should be noted that, when sending the quality parameter to the network side device, the terminal reports the quality parameter according to a protocol type of signaling carrying the quality parameter. For example, if the configuration information sent by the network side device to the terminal is carried by RRC signaling, the terminal reports the quality parameter by using uplink RRC signaling, for example, a measurement report in LTE. If the configuration information sent by the network side device to the terminal is carried by NAS signaling, the terminal reports the quality parameter by using uplink NAS signaling, for example, Attach Accept in LTE.

Figure 5:
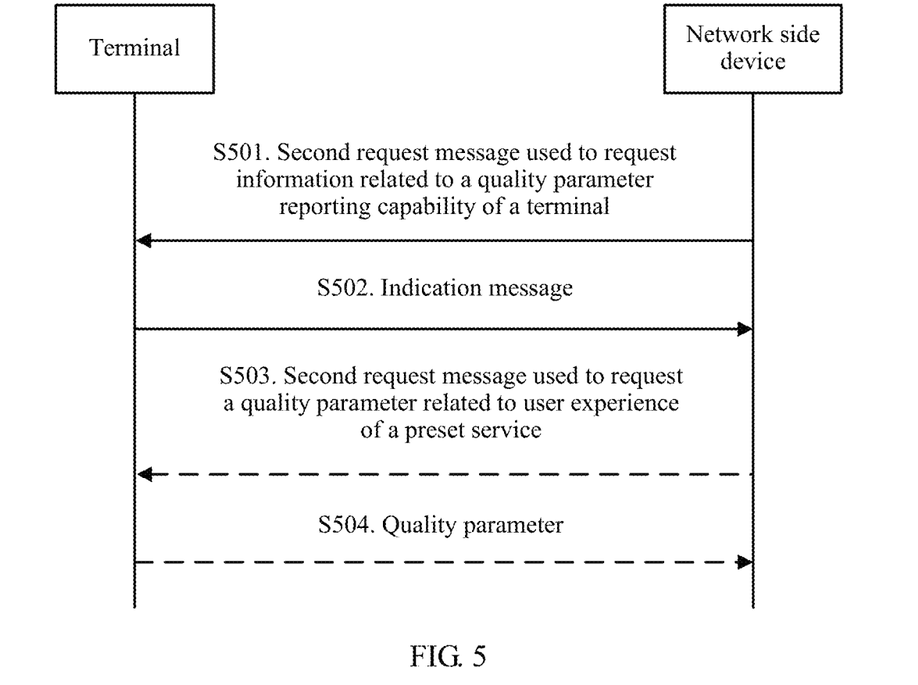
FIG. 5 is a schematic diagram of another quality parameter transmission method according to an embodiment of the present invention.

To better understand and implement the foregoing solutions according to embodiments of the present invention, the following further describes an embodiment of the present invention with reference to FIG. 5.

FIG. 5 is a schematic diagram of another quality parameter transmission method according to an embodiment of the present invention. In the method shown in FIG. 5, for content that is the same as or similar to that in the method shown in FIG. 3, refer to detailed descriptions in FIG. 3. Details are not described herein again. As shown in FIG. 5, the method may include the following parts.

In a step S501, a network side device sends a second request message to a terminal, where the second request message is used to request information related to a quality parameter reporting capability of the terminal.

Preferably, the first request message requests the terminal to transmit upward a service type supported by the terminal and a quality parameter related to the service type.

In a step S502, the terminal sends an indication message to the network side device.

The indication message carries first indication information or third indication information. The first indication information is used to indicate that the terminal has the quality parameter reporting capability, and the third indication information is used to indicate that the terminal does not have the quality parameter reporting capability.

In an example, when the indication message carries the first indication information, a step S503 and a step S504 are further performed.

In another example, when the indication message carries the third indication information, a step S503 and a step S504 are not further performed.

In the step S503, when the indication message carries the first indication information, the network side device sends a first request message to the terminal, where the first request message is used to request a quality parameter related to user experience of a preset service.

In the step S504, the terminal sends the quality parameter to the network side device.

Still further, while reporting quality parameters, the terminal may further report information about a time point at which these parameters are recorded.

For example, in an implementation, the network side device sends a second request message to the terminal, to request the terminal to report whether the terminal has a video service quality parameter reporting capability, and report a quality parameter that can be reported by the terminal. The terminal sends an indication message to the network side device, to inform the network side device that the terminal has a capability of obtaining all quality parameters related to user experience of the video service, and then the network side device further sends the first request message to the terminal. The first request message is used to request all quality parameters related to user experience of the video service. Finally, the terminal sends the obtained quality parameters to the network side device.

It may be learned that, in the solution in this embodiment, after the network side device sends the second request message to the terminal, the terminal sends, to the network side device, the indication message of the quality parameter obtaining capability, and then the network side device further sends, to the terminal, the first request message for obtaining the quality parameter. Finally, after obtaining the quality parameter, the terminal sends the quality parameter to the network side device, so that the network side device obtains, from the terminal, the quality parameter related to user experience of the preset service and can evaluate network operation quality by using the quality parameter, to facilitate network optimization, provide better network quality for the terminal, and improve user experience.

In this embodiment of the present invention, the network side device may be a base station, or may be another network node such as an SGSN, a mobility management entity, a network entity of a non-access stratum, or a network entity of a radio resource control layer, or may be a network management unit such as an OSS. The OSS takes charge of helping an operator to formulate an operations support system suitable for a feature of the operator and helping the operator to determine a system development direction. In addition, the OSS can further help a subscriber to formulate a system integration standard, to improve and enhance service quality for the subscriber.

In a possible implementation, the OSS may send configuration information to the base station, and the OSS indicates, in the configuration information, information such as a parameter (the parameter herein is the same as the parameter described above), a reporting manner (for example, a periodic manner, an event-triggered manner, and the like), and a service type that needs to be reported by the terminal. Further, the OSS may further indicate, in the configuration information, at least one of the following information:

1. An indication related to a particular terminal reporting a QoE parameter. In this case, an identifier of the terminal may be added to the configuration information, for example, an international mobile subscriber identity (IMSI) or a temporary mobile subscriber identity (TMSI). After receiving the configuration information, the base station may send the configuration information to the particular terminal.

2. An indication related to a reporting terminal in a particular area, for example, an indication related to reporting terminals in some cells or some public land mobile networks (PLMN). In this case, configuration information needs to include at least one cell identifier (for example, a cell global identification (CGI) of the cell) or a base station identification. Further, the configuration information may further include a PLMN identifier.

3. An indication related to a particular service type. For example, the particular service type may be a video or web browsing. Further, if the particular service type is a video, a type of the video may be further indicated, for example, on-demand streaming media, live streaming, interactive streaming media (such as FaceTime, Skype, and WeChat), DASH, or HTTP-based streaming.

Further, after receiving the configuration information from the OSS, the base station may directly send the configuration information to the terminal, or may add other information to the configuration information according to a requirement of the base station, and then send the configuration information to the terminal.

The foregoing mainly describes solutions provided in exemplary embodiments of the present invention from a perspective of interaction between the network side device and the terminal. It may be understood that, to implement the foregoing functions, the network side device and the terminal include corresponding hardware structures and/or software modules for performing the functions. With reference to units and algorithm steps of each example described herein, the exemplary embodiments of the present invention may be implemented in a form of hardware or a combination of hardware and computer software. Whether a function is performed by hardware or computer software driving hardware depends on particular applications and design constraint conditions of the technical solutions. A person skilled in the art may use different methods for each particular application to implement the described functions, but it should not be construed that the implementation goes beyond the scope of technical solutions of embodiments of the present invention.

In embodiments of the present invention, functional unit division may be performed on the network side device, the terminal, and the like based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that logical function division is merely an example. There may be another division manner in actual implementation.

Figure 6:
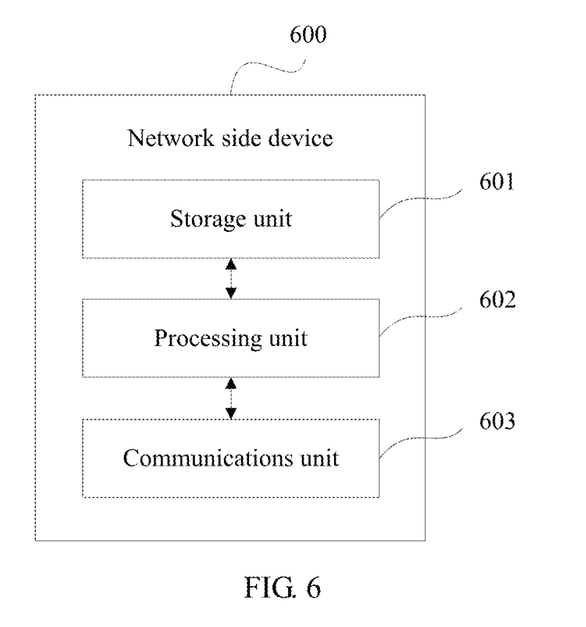
FIG. 6 is a schematic structural diagram of a possible network side device according to an embodiment of the present invention.

When an integrated unit is used, FIG. 6 is a schematic structural diagram of a possible network side device 600 according to an embodiment of the present invention. The network side device 600 includes a processing unit 602 and a communications unit 603. The processing unit 602 is configured to control and manage an action of the network side device 600. For example, the processing unit 602 is configured to support the network side device 600 in performing the step S301 in FIG. 3, and the processes S501 and S503 in FIG. 5. The communications unit 603 is configured to support communication between the network side device 600 and another network entity, for example, communication between the network side device 600 and a terminal. The network side device 600 may further include a storage unit 601, configured to store program code and data of the network side device 600.

The processing unit 602 may be a processor or a controller. The communications unit 603 may be a communications interface, a transceiver, a transceiver circuit, or the like. The communications interface is a generic term, and may include one or more interfaces. The storage unit 601 may be a memory.

Figure 7:
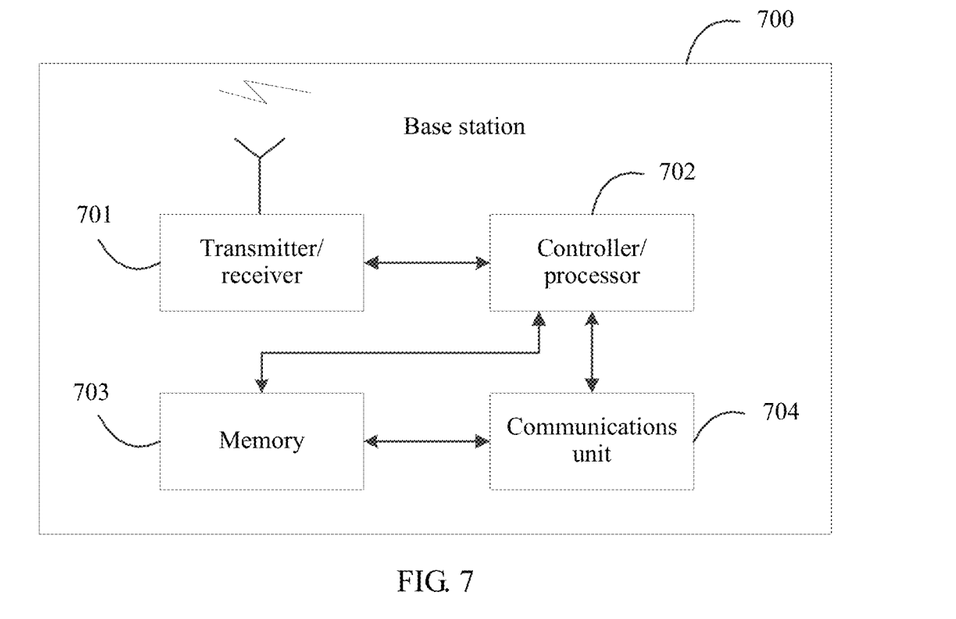
FIG. 7 is a schematic structural diagram of a possible base station according to an embodiment of the present invention.

When the processing unit 602 is a processor, the communications unit 603 is a transceiver, and the storage unit 601 is a memory, the network side device 600 in this embodiment of the present invention may be a network side device shown in FIG. 7. For example, the network side device shown in FIG. 7 may be a base station 700.

FIG. 7 shows a possible base station 700 according to an embodiment of the present invention. In other words, FIG. 7 shows another possible network side device provided in this embodiment of the present invention.

The base station 700 includes a transmitter/receiver 701 and a processor 702. The processor 702 may also be a controller, and is indicated as a "controller/processor 702" in FIG. 7. The transmitter/receiver 701 is configured to: support the base station in sending/receiving information to/from the terminal in the foregoing embodiments, and support radio communication between the terminal and another terminal. The processor 702 performs various functions for communication with the terminal. On an uplink, an uplink signal from the terminal is received by using an antenna, is demodulated (for example, a high frequency signal is demodulated into a baseband signal) by the receiver 701, and is further processed by the processor 702, to restore service data and signaling information sent by the terminal. On a downlink, service data and a signaling message are processed by the processor 702, and are modulated (for example, a baseband signal is modulated into a high frequency signal) by the transmitter 701, to generate a downlink signal, and the downlink signal is transmitted to the terminal by using the antenna. It should be noted that the foregoing demodulation or modulation function may be implemented by the processor 702. For example, the processor 702 is further configured to perform the step S301 in FIG. 3, the processes S501 and S503 in FIG. 5, and/or another process of technical solutions described herein.

Further, the base station 700 may further include a memory 703, and the memory 703 is configured to store program code and data of the base station 500. In addition, the base station may further include a communications unit 704. The communications unit 704 is configured to support communication between the base station and another network entity (for example, a network device in a core network). For example, in an LTE system, the communications unit 704 may be an S1-U interface, configured to support communication between the base station and a serving gateway (S-GW); or the communications unit 704 may be an S1-MME interface, configured to support communication between the base station and a mobility management entity (MME).

It may be understood that FIG. 7 shows merely a simplified design of the base station 700. In actual application, the base station 700 may include any quantity of transmitters, receivers, processors, controllers, memories, communications units, and the like, and all base stations that can implement embodiments of the present invention fall within the protection scope of the embodiments of the present invention.

Figure 8:
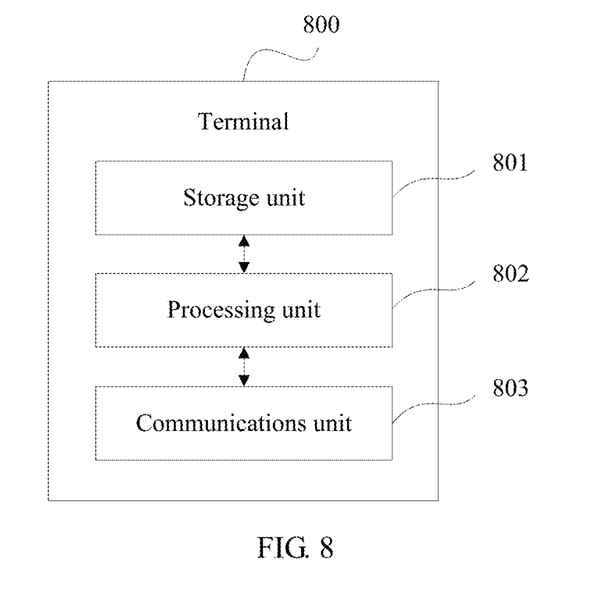
FIG. 8 is a schematic structural diagram of another possible terminal according to an embodiment of the present invention.

FIG. 8 is a schematic structural diagram of another possible terminal 800 according to an embodiment of the present invention. The terminal 800 includes a processing unit 802 and a communications unit 803. The processing unit 802 is configured to control and manage an action of the terminal 800. For example, the processing unit 802 is configured to support the terminal 800 in performing the step S302 in FIG. 3, the processes S502 and S504 in FIG. 5, and/or another process of the technology described in this specification. The communications unit 803 is configured to support communication between the terminal 800 and another network entity, for example, communication between the terminal 800 and a network side device. The terminal 800 may further include a storage unit 801, configured to store program code and data of the terminal 800.

The processing unit 802 may be a processor or a controller. The communications unit 803 may be a communications interface, a transceiver, a transceiver circuit, or the like. The communications interface is a generic term, and may include one or more interfaces. The storage unit 801 may be a memory.

Figure 9:
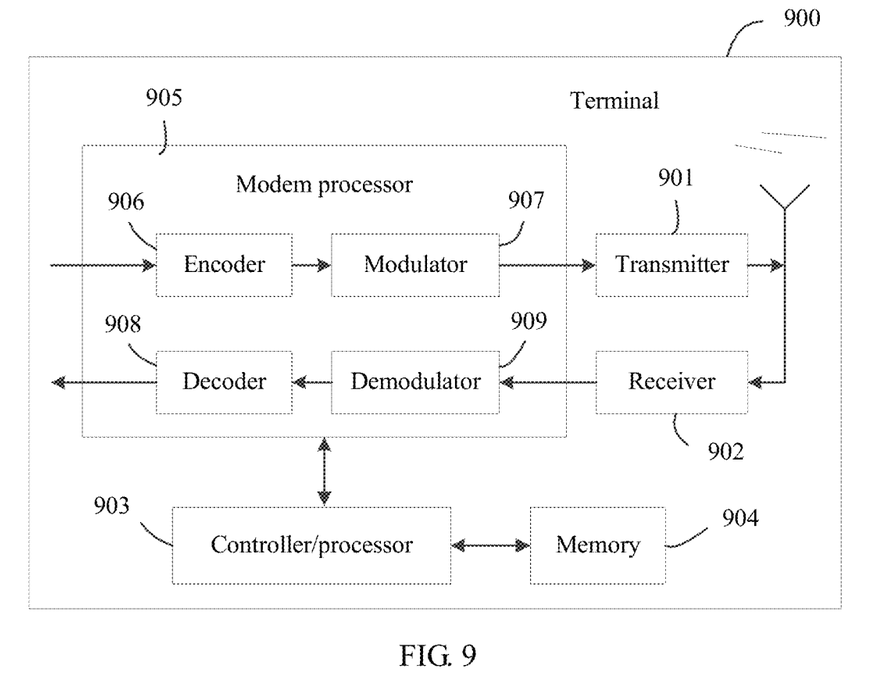
FIG. 9 is a schematic structural diagram of still another possible terminal according to an embodiment of the present invention.

When the processing unit 802 is a processor, the communications unit 803 is a transceiver, and the storage unit 801 is a memory, the terminal 800 in this embodiment of the present invention may be a terminal shown in FIG. 9.

FIG. 9 is a simplified schematic diagram of another possible design structure of a terminal in an embodiment of the present invention. The terminal 900 includes a transmitter 901, a receiver 902, and a processor 903. The processor 903 may also be a controller, and is indicated as a "controller/processor 903" in FIG. 9. Optionally, the terminal 900 may further include a modem processor 905, and the modem processor 905 may include an encoder 906, a modulator 907, a decoder 908, and a demodulator 909.

In an example, the transmitter 901 adjusts (for example, through analog conversion, filtering, amplification, and up-conversion) an output sample and generates an uplink signal. The uplink signal is transmitted to the base station in the foregoing embodiments by using an antenna. On a downlink, the antenna receives a downlink signal transmitted by the base station in the foregoing embodiments. The receiver 902 adjusts (for example, through filtering, amplification, down-conversion, and digitization) the signal received from the antenna and provides an input sample. In the modem processor 905, the encoder 906 receives service data and a signaling message to be sent on the uplink, and processes (for example, through formatting, encoding, and interleaving) the service data and the signaling message. The modulator 907 further processes (for example, through symbol mapping and modulation) encoded service data and an encoded signaling message, and provides an output sample. A demodulator 909 processes (for example, through demodulation) the input sample and provides symbol estimation. A decoder 908 processes (for example, through de-interleaving and decoding) symbol estimation and provides decoded data and a decoded signaling message that are to be sent to the terminal 900. The encoder 906, the modulator 907, the demodulator 909, and the decoder 908 may be implemented through the integrated modem processor 905. These units perform processing based on a radio access technology (for example, an access technology of LTE or another evolution system) used by a radio access network. It should be noted that when the terminal 900 does not include the modem processor 905, the foregoing functions of the modem processor 905 may be implemented by the processor 903.

The processor 903 controls and manages an action of the terminal 900, and is configured to perform processes performed by the terminal in the foregoing embodiments of the present invention. For example, the processor 903 is further configured to perform the step S302 in FIG. 3, the processes S502 and S504 in FIG. 5, and/or another process of the technical solutions described in this application.

Further, the terminal 900 may further include a memory 904, and the memory 904 is configured to store program code and data used for the terminal 900.

The processor configured to perform the foregoing functions of the base station or the terminal may be a central processing unit (CPU), a general-purpose processor, a digital signal processor (DSP), an application-specific integrated circuit (ASIC), a field programmable gate array (FPGA) or another programmable logical device, a transistor logical device, a hardware component, or a combination thereof. The processor may implement or execute various example logical blocks, modules, and circuits described with reference to content disclosed herein. Alternatively, the processor may be a combination of processors implementing a computing function, for example, a combination of one or more microprocessors, or a combination of a DSP and a microprocessor.

Methods or algorithm steps described in combination with the content disclosed in this embodiment of the present invention may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a base station or a terminal. Certainly, the processor and the storage medium may exist in a base station or terminal as discrete components.

A person skilled in the art should be aware that in the foregoing one or more examples, functions described herein may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

In the foregoing specific implementations, objectives, technical solutions, and benefits of embodiments of the present invention are described in detail. It should be understood that the foregoing descriptions are merely exemplary implementations of embodiments of the present invention, but are not intended to limit the scope of the present invention. Any modification, equivalent replacement, or improvement made based on technical solutions of embodiments of the present invention shall fall within the protection scope of the embodiments of the present invention.

Additionally, statements made herein characterizing the invention refer to an embodiment of the invention and not necessarily all embodiments.

What is claimed is:

1. A quality parameter transmission method, wherein the method comprises:

sending, by a terminal, an indication message to a network side device, wherein the indication message indicates that the terminal is capable of reporting a quality parameter related to user experience of a preset service, wherein the preset service comprises a streaming service and/or an interactive service;

after sending the indication message to the network side device, receiving, by the terminal, from the network side device, a request for the quality parameter related to user experience of the preset service; and in response to the request, sending, by the terminal, a value of the quality parameter related to user experience of the preset service to the network side device;

wherein a protocol corresponding to the streaming service comprises at least one of the following: a video protocol based on Dynamic Adaptive Streaming over Hypertext Transfer Protocol (HTTP) (DASH), a progressive download (PD) video protocol, or a video protocol based on HTTP Live Streaming (HLS);

wherein the quality parameter comprises at least one of the following: a list of HTTP requests or responses, a list of switch events, an average throughput, an initial playout delay, a buffer data volume, a play information list, media presentation description (MPD) information, a web response delay, a first page opening delay, a whole page opening delay, or a page integrity indication.

2. The method according to claim 1, wherein the indication message further carries a service supported by the terminal.

3. The method according to claim 1, wherein the value of the quality parameter is sent to the network side device in at least one of the following reporting manners:

sending, by the terminal, the value of the quality parameter to the network side device periodically;

sending, by the terminal, the value of the quality parameter to the network side device when the value of the quality parameter meets a preset condition;

sending, by the terminal, the value of the quality parameter to the network side device when the preset service ends;

sending, by the terminal, the value of the quality parameter to the network side device in a specified time period or at a specified time; or sending, by the terminal, the value of the quality parameter to the network side device when a particular event occurs.

4. The method according to claim 3, wherein the method further comprises:

receiving, by the terminal, second indication information from the network side device for informing the terminal of at least one reporting manner for sending the value of the quality parameter to the network side device.

5. A quality parameter transmission method, wherein the method comprises:

receiving, by a network side device, an indication message from a terminal, wherein the indication message indicates whether the terminal is capable of reporting a quality parameter related to user experience of a preset service, wherein the preset service comprises a streaming service and/or an interactive service;

based on the indication message indicating that the terminal is capable of reporting the quality parameter related to user experience of the preset service, sending, by the network side device, a request to the terminal for the quality parameter related to user experience of the preset service; and after sending the request to the terminal for the quality parameter related to user experience of the preset service, receiving, by the network side device, a value of the quality parameter from the terminal;

wherein a protocol corresponding to the streaming service comprises at least one of the following: a video protocol based on Dynamic Adaptive Streaming over Hypertext Transfer Protocol (HTTP) (DASH), a progressive download (PD) video protocol, or a video protocol based on HTTP Live Streaming (HLS);

wherein the quality parameter comprises at least one of the following: a list of HTTP requests or responses, a list of switch events, an average throughput, an initial playout delay, a buffer data volume, a play information list, media presentation description (MPD) information, a web response delay, a first page opening delay, a whole page opening delay, or a page integrity indication.

6. The method according to claim 5, wherein the indication message further carries a service supported by the terminal.

7. The method according to claim 5, wherein the value of the quality parameter is received from the terminal in at least one of the following reporting manners:

receiving, by the network side device, the value of the quality parameter periodically sent by the terminal;

receiving, by the network side device, the value of the quality parameter sent by the terminal when the value of the quality parameter meets a preset condition;

receiving, by the network side device, the value of the quality parameter sent by the terminal when the preset service ends;

receiving, by the network side device, the value of the quality parameter sent by the terminal in a specified time period or at a specified time; or receiving, by the network side device, the value of the quality parameter sent by the terminal when a particular event occurs.

8. The method according to claim 7, wherein the method further comprises:

sending, by the network side device, second indication information to the terminal for informing the terminal of at least one reporting manner for sending the value of the quality parameter to the network side device.

9. A terminal, comprising a memory having processor-executable instructions stored thereon; and a processor, coupled to the memory, configured to execute the processor-executable instructions to facilitate:

sending an indication message to a network side device, wherein the indication message indicates that the terminal is capable of reporting a quality parameter related to user experience of a preset service, wherein the preset service comprises a streaming service and/or an interactive service;

after sending the indication message to the network side device, receiving a request from the network side device for the quality parameter related to user experience of the preset service; and in response to the request, sending a value of the quality parameter related to user experience of the preset service to the network side device;

wherein a protocol corresponding to the streaming service comprises at least one of the following: a video protocol based on Dynamic Adaptive Streaming over Hypertext Transfer Protocol (HTTP) (DASH), a progressive download (PD) video protocol, or a video protocol based on HTTP Live Streaming (HLS);

wherein the quality parameter comprises at least one of the following: a list of HTTP requests or responses, a list of switch events, an average throughput, an initial playout delay, a buffer data volume, a play information list, media presentation description (MPD) information, a web response delay, a first page opening delay, a whole page opening delay, or a page integrity indication.

10. The terminal according to claim 9, wherein the indication message further carries a service supported by the terminal.

11. The terminal according to claim 9, wherein the processor is further configured to execute the processor-executable instructions to facilitate sending the value of the quality parameter to the network side device according to at least one of the following reporting manners:

sending the value of the quality parameter to the network side device periodically;

sending the value of the quality parameter to the network side device when the quality parameter meets a preset condition;

sending the value of the quality parameter to the network side device when the preset service ends;

sending the value of the quality parameter to the network side device in a specified time period or at a specified time; or sending the value of the quality parameter to the network side device when a particular event occurs.

12. The terminal according to claim 11, wherein the processor is further configured to execute the processor-executable instructions to facilitate:

receiving second indication information from the network side device for informing the terminal of at least one reporting manner for sending the value of the quality parameter to the network side device.

13. A network side device, comprising:

a memory having processor-executable instructions stored thereon; and a processor, configured to execute the processor-executable instructions to facilitate:

receiving an indication message from a terminal, wherein the indication message indicates whether the terminal is capable of reporting a quality parameter related to user experience of a preset service, wherein the preset service comprises a streaming service and/or an interactive service;

based on the indication message indicating that the terminal is capable of reporting the quality parameter related to user experience of the preset service, sending a request to the terminal for the quality parameter related to user experience of the preset service; and after sending the request to the terminal for the quality parameter related to user experience of the preset service, receiving a value of the quality parameter related to user experience of the preset service from the terminal;

wherein a protocol corresponding to the streaming service comprises at least one of the following: a video protocol based on Dynamic Adaptive Streaming over Hypertext Transfer Protocol (HTTP) (DASH), a progressive download (PD) video protocol, or a video protocol based on HTTP Live Streaming (HLS);

wherein the quality parameter comprises at least one of the following: a list of HTTP requests or responses, a list of switch events, an average throughput, an initial playout delay, a buffer data volume, a play information list, media presentation description (MPD) information, a web response delay, a first page opening delay, a whole page opening delay, or a page integrity indication.

14. The network side device according to claim 13, wherein the indication message further carries a service supported by the terminal.

15. The network side device according to claim 13, wherein the processor is further configured to execute the processor-executable instructions to facilitate receiving the value of the quality parameter from the terminal according to at least one of the following reporting manners:

receiving the value of the quality parameter periodically from the terminal;

receiving the value of the quality parameter from the terminal when the value of the quality parameter meets a preset condition;

receiving the value of the quality parameter from the terminal when the preset service ends;

receiving the value of the quality parameter from the terminal in a specified time period or at a specified time; or receiving the value of the quality parameter from the terminal when a particular event occurs.

16. The network side device according to claim 15, wherein the processor is further configured to execute the processor-executable instructions to facilitate:

sending second indication information to the terminal, wherein the second indication information is for informing the terminal of at least one reporting manner for sending the value of the quality parameter to the network side device.

* * * * *